Oct. 22, 1963 SABURO UEMURA ETAL 3,108,281

MAGNETIC VIDEO RECORDING DEVICE

Filed Jan. 19, 1961 2 Sheets-Sheet 1

Inventors
Saburo Uemura
Kengo Matsumoto
Toshio Yokoyama by Hill, Sherman, Meroni, Gross & Simpson
Attys.

Oct. 22, 1963 SABURO UEMURA ETAL 3,108,281

MAGNETIC VIDEO RECORDING DEVICE

Filed Jan. 19, 1961 2 Sheets-Sheet 2

Inventors
Saburo Uemura
Kengo Matsumoto
Toshio Yokoyama by Hill, Sherman, Meroni, Gross & Simpson Attys.

United States Patent Office 3,108,281

Patented Oct. 22, 1963

3,108,281
MAGNETIC VIDEO RECORDING DEVICE

Saburo Uemura, Kengo Matsumoto, and Toshio Yokoyama, all of Tokyo, Japan, assignors to Sony Corporation, Shinagawa-ku, Tokyo, Japan, a corporation of Japan Filed Jan. 19, 1961, Ser. No. 83,661
Claims priority, application Japan Jan. 26, 1960
3 Claims. (Cl. 346—74)

This invention relates to magnetic video recording devices and, more particularly, to a device wherein a picture is magnetically recorded on a magnetic sheet and later made visible by ferromagnetic powder which is put onto the magnetic record of the picture.

A method of making a magnetic latent image of a picture by magnetic recording on a magnetic sheet and later putting a ferromagnetic powder on the surface of the magnetic sheet to make the image visible is well known in the art as ferrography. Conventional apparatus for practicing this art has been deficient however in that the reproduction of half-tones has been poor.

Accordingly one object of this invention is to provide a magnetic video recording device which gives abundant half-tones to an image and thereby improves the quality of the reproduction.

Another object of this invention is to provide a ferrographic device in which the half-tones are given to the visible reproduced image by changing the area of the picture elements making up the image to produce an original picture on which area ferromagnetic powder is attached that has abundant contrast.

Other objects, features and advantages of this invention will be fully apparent from the following detailed description taken in connection with the accompanying figures of the drawings, in which.

Figures 2, 2A, 3, 4:
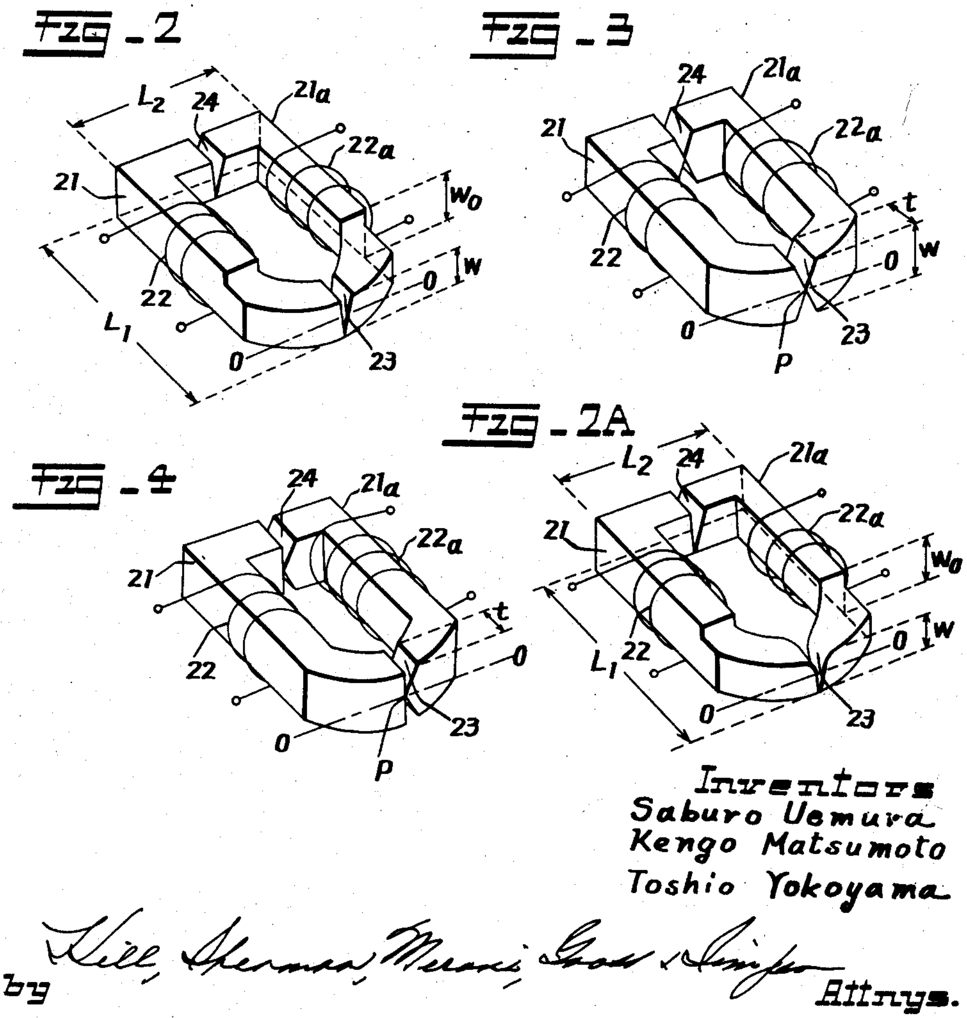
FIGURE 2 is a perspective view of a magnetic head constructed in accordance with this invention.
Figure 5:
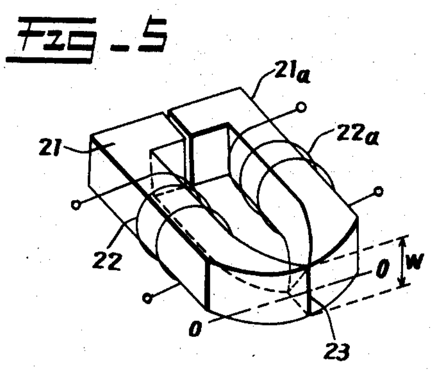
Figure 7:
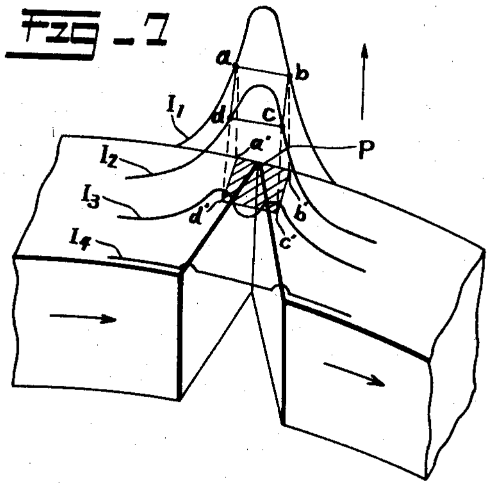
Figure 6:
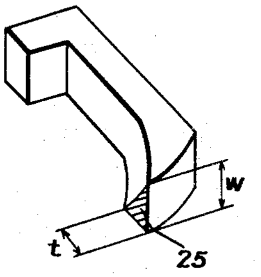
Figure 8:
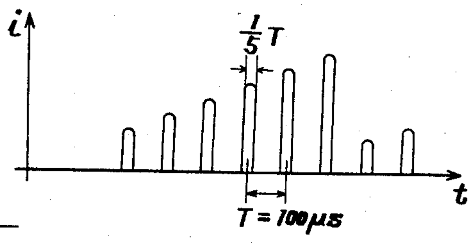
Figure 9:
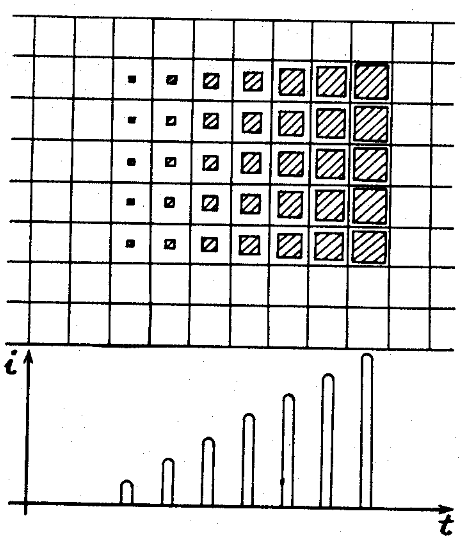

FIGURE 2–A is a perspective view of a magnetic head constructed in accordance with another embodiment;

FIGURE 3 is a perspective view of a magnetic head constructed in accordance with another embodiment;

FIGURE 4 is a perspective view of a magnetic head constructed in accordance with another embodiment;

FIGURE 5 is a perspective view of a magnetic head constructed in accordance with another embodiment;

FIGURE 6 is a perspective view of a portion of the magnetic head shown in FIGURE 5;

FIGURE 7 is a schematic diagram illustrating the magnetic field intensity at the operating air-gap portion of the magnetic head shown in FIGURE 2;

FIGURE 8 shows curves which illustrate the magnitude of the pulse signal currents corresponding to the brightness of picture elements; and FIGURE 9 is a schematic diagram which illustrates the half-tones of the picture elements obtained in accordance with this invention.

Figure 1:
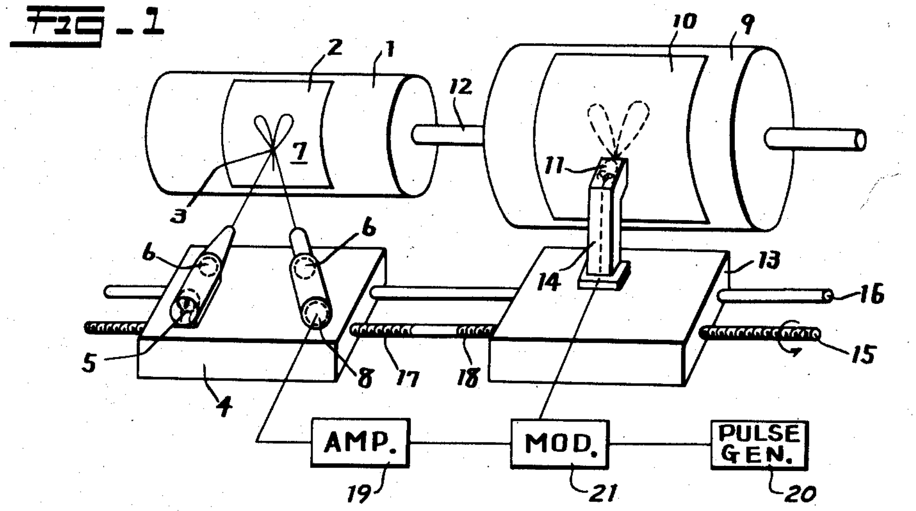
FIGURE 1 is a diagrammatic view of an apparatus for practicing the art of ferrography.

FIGURE 1 is a schematic diagram of an apparatus for practicing the art of ferrography. 1 is a rotary cylinder, on the surface of which is fastened an image 2 which may be a picture, printing or photograph. The original image or picture 2 is scanned by a light beam 3 in such a manner that a current corresponding to the brightness of each picture element is obtained.

To this end, on a translating table 4 is disposed an optical system which includes a light source 5 and a lens 6, and a photoelectric device 8, for example, a photoelectric tube or photo-transistor, which receives the reflected ray from the scanning points on the original picture

2 and converts the quantity of light received into electricity. 9 is a rotary cylinder which revolves in synchronism with the cylinder 1, and has a magnetic sheet 10 coated with a layer of a magnetic material attached to its surface. A magnetic head 11 is mounted to contact the magnetic sheet 10 and thereby scan the surface of the magnetic sheet 10 in synchronism with the scanning of the light beam 3.

In one mechanism for accomplishing this synchronous scanning, the rotary cylinders 1 and 9 are mounted on the same rotary shaft 12, and the magnetic head 11 is supported by an arm 14 that is fixed on a translating table 13. The translating tables 4 and 13 are so constructed as to mesh with a drive feed screw 15 and be guided by a guide shaft 16 which is arranged in parallel to the screw 15.

The amount by which the original picture 2 is horizontally magnified is determined by the pitches of the two screw parts 17 and 18 of the feed screw 15. The screw part 17 meshes with the translating table 4 and the screw part 18 meshes with the table 13. The vertical magnification can be adjusted by varying the diameters of the two cylinders 1 and 9.

The output from the photoelectric device 8 is amplified by an amplifier 19, the output of which is fed into a modulator 21 which also receives the output of a pulse generator 20. The modulated current output is then delivered to the magnetic head 11.

In a conventional method of making visual the image recorded on the magnetic sheet 10, a ferromagnetic powder is attached to the sheet by passing it through a container in which the ferromagnetic powder is stored. The ferromagnetic powder attaches to the sheet in quantities that vary in accordance with the contrast or brightness of the picture elements of the original picture. Unnecessary powder is later brushed off, leaving the desired picture image.

It has been customary when producing such a picture to use a magnetic head that has a thin and constant width operating air-gap. It has been found out, however, that the image so obtained is deficient and that the so-called half-tones are very poor.

Referring to FIGURES 2–5, several examples of magnetic heads are illustrated which can be used in accordance with this invention. In FIGURE 2 signal coils 22 and **22*a* are wound around a pair of magnetic cores 21 and 21*a* which form an operating air-gap 23, between them. A back air-gap 24 is also formed between the two cores. The operating air gap 23 is wedge or V-shaped by disposing a tapered end face of the core 21*a* opposite to the end face of the other core 21 which is perpendicular to the direction O—O of the motion of the magnetic head relative to a sheet, the apex of the V being at one side of the cores 21 and 21*a***.

In FIGURE 3, an X-shaped operating air-gap 23 is formed, the intersecting point P of which is substantially at the center of the core width.

In FIGURE 4, the operating air-gap 23 is K-shaped with substantially the center of the core width at the intersecting point P. In the above examples, the depth $t$ of the core is substantially constant, and in FIGURES 2 and 4 the depth $t$ of the core is also substantially constant with respect to the track width.

FIGURE 5 shows another construction in which the air-gap portion that contacts the magnetic sheet has a constant width W and the core depth $t$ at the air-gap decreases gradually from the bottom to the top. The air-gap 23 is very thin and has a constant width. FIGURE 6 is a perspective view of FIG. 5 better showing the shape of the air-gap which is indicated by the hatched portion 25.

In accordance with this invention, a magnetic head which has an operating air-gap formed as described produces a magnetic field intensity at the front of the magnetic head where it contacts the magnetic sheet that is not constant but rather has a gradient relative to the width W of the magnetic core air-gap portion which is also the track width. Therefore, the area in which each picture element on the magnetic sheet is magnetized may be varied in accordance with the magnitude of signal currents being delivered to the coils 22 and 22*a*.

This can be better explained using a magnetic head that has a wedge V-shaped operating air-gap of the type shown in FIGURE 2. FIGURE 7 is an enlarged perspective view of the V-shaped operating air-gap portion of such a magnetic head, and FIGURE 8 represents signal currents that are fed to the coils 22 and 22*a*, the amplitudes of which vary in accordance with the brightness of various picture elements of the original picture.

In this example, the interval between the signal current pulses is made 100 micro-seconds, for instance, and the width of each signal pulse is less than 1/5 thereof.

The magnetic field intensity distribution in the vicinity of the V-shaped operating air-gap 23 at the time of delivering the signal current of some value to the coils 22 and 22*a* can be shown by the curves $I_1$, $I_2$, $I_3$ and $I_4$ in FIGURE 7. That is, it will be easily understood that the magnetic field intensity is maximum near the apex P of the V-shaped air-gap and that it decreases gradually as the air-gap becomes wider along the V away from the apex. The magnetic field intensity at the points which contact the magnetic sheet which is sufficient to magnetically saturate the sheet is indicated by the boundary points *a* and *b* on the curve $I_1$ and *c* and *d* on the curve $I_2$.

The area enclosed by the points, *a*, *b*, *c* and *d* may be considered to correspond to the area in which the contact point of the magnetic sheet is magnetically saturated by the signal current. Therefore, if these points are projected on the magnetic sheet that contacts the magnetic core, the magnetically saturated area surrounded by points *a'*, *b'*, *c'*, and *d'* is obtained.

When the signal current varies from the above one described in accordance with a change in the brightness of the picture elements, the conditions of the curves showing the magnetic field intensity vary with the signal current, so that the area surrounded by the points *a*, *b*, *c* and *d* and *a'*, *b'*, *c'*, and *d'* changes. Therefore, it is apparent that as the signal current varies in accordance with the brightness of each picture element on the original picture, as shown in FIGURE 8, the magnetic saturation area of the corresponding picture elements on the magnetic sheet also varies correspondingly. Accordingly, when the ferromagnetic powder is sprinkled on the magnetically recorded sheet the quantity of powder that attaches to the area, varies in accordance with the brightness of the picture elements of the original picture.

In the other words, the area of each picture element to be covered by the ferromagnetic powder varies in accordance with the order of brightness between the brightest and the darkest points of picture elements of the original picture, so that the so-called half-tones are adequately produced.

When using magnetic heads having operating air-gaps in the shapes shown in FIGURES 3 through 5, it will be apparent that the half-tones are also produced for the same reasons as above described with reference to FIGURE 2. The magnetic field intensity varies with distance from the narrowed portion of the air-gap in the manner previously explained.

When a magnetic image so obtained is negative, it is further transcribed onto other sheet and printed on an ordinary photographic printing paper, thereby obtaining the desired positive image. If, however, the signal current is made to vary in reverse proportion to the brightness of the picture elements of the original picture, a positive magnetic image is directly produced on the magnetic sheet.

An example of the dimensions of a magnetic head having the V-shaped operating air-gap shown in FIGURES 2 and 7 is as follows:

Length of the magnetic core: $L_1=6$ mm.
Width of the magnetic core: $L_2=6$ mm.
Width of the air-gap portion of the magnetic core (track width): $W=0.12$ mm.
Thickness of other parts except the air-gap portion of the magnetic core: $W_0=0.5$ mm.
Width of the operating air-gap (at the bottom): About 100 microns.
Angle of the V shape: About 50°.

The above description has been made in connection with one example of the magnetic head, but it has been found out in this case that the shape of each picture element covered by the ferromagnetic powder on the sheet is about square when the angle of the V shape is properly selected. The angle of the V shape should be within the range of 30° to 70° and preferably between 50° to 60°. Too large an angle will not produce good results.

FIGURE 9 is an enlarged diagram illustrating the conditions of the picture elements of a picture when the delivering current to the coils 22 and 22*a* increases gradually from the left to the right in each row, in which each picture element differs in area with the brightness of the picture elements of an original picture.

Also the experiments indicate that better results can be obtained when both shoulders of the V are made rather round as shown in FIGURE 2–A.

In accordance with this invention, instead of changing the shape of the magnetic core at the operating air-gap as shown in FIGURES 2 through 5, the magnetic material of this portion can be changed and still obtain substantially the same magnetic field intensity distribution as aforementioned.

It will be apparent that modifications and variations may be effected without departing from the scope of the novel concepts of this invention.

What is claimed is:

1. Image recording means comprising
a magnetic sheet record medium having a surface for receiving an image recording,
a magnetic head comprising a pair of confronting magnetic poles with a gap therebetween for coupling to successive regions of the surface of said record medium,
said head having signal flux paths of successively different reluctance linking successive confronting portions of said magnetic poles with successively offset portions of a region of the surface of said record medium with which said head is coupled,
electric circuit means coupled to said signal flux paths of said head for exerting a signal magnetomotive force thereon producing magnetic fields at the surface of the record medium of effective amplitude to be recorded thereon over a proportion of the extent of said confronting poles and over a proportion of said region of said record medium surface which is a function of the amplitude of current flow in said electric circuit means,
means for receiving an image signal varying in accordance with an image to be recorded on said record medium and coupled to said electric circuit means for supplying electric current pulses to said electric circuit means during coupling of the head to respective regions of the record medium surface varying in amplitude in accordance with the image signal to be recorded,
means for relatively moving said head into coupling relation to the successive regions of the surface of the record medium which form an area array covering the effective area of the record medium surface, and means for maintaining the head at substantially a constant position with respect to a direction normal to the surface of the record medium during recording of an image on the record medium.

2. The image recording means of claim 1 wherein said gap has a K shape with the point of minimum spacing between said magnetic poles being located centrally of the extent of said gap.

3. Image recording means in accordance with claim 1 wherein the varying reluctance of the successive signal flux paths is provided by the use of different magnetic materials therein.

References Cited in the file of this patent

UNITED STATES PATENTS

| | | |
|---|---|---|
| 2,822,427 | Atkinson et al. | Feb. 4, 1958 |
| 2,853,560 | Atkinson et al. | Sept. 23, 1958 |
| 2,924,653 | Fairchild | Feb. 9, 1960 |